March 11, 1969  E. W. MILLER  3,432,119
HELICOPTER
Filed Oct. 24, 1966
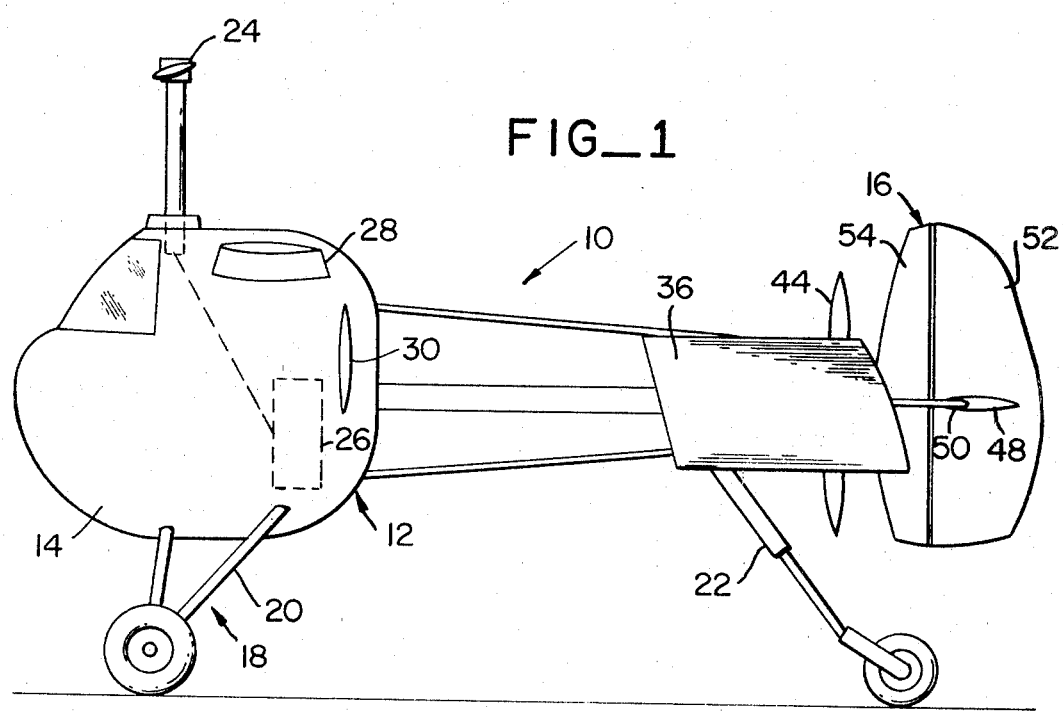
FIG_1
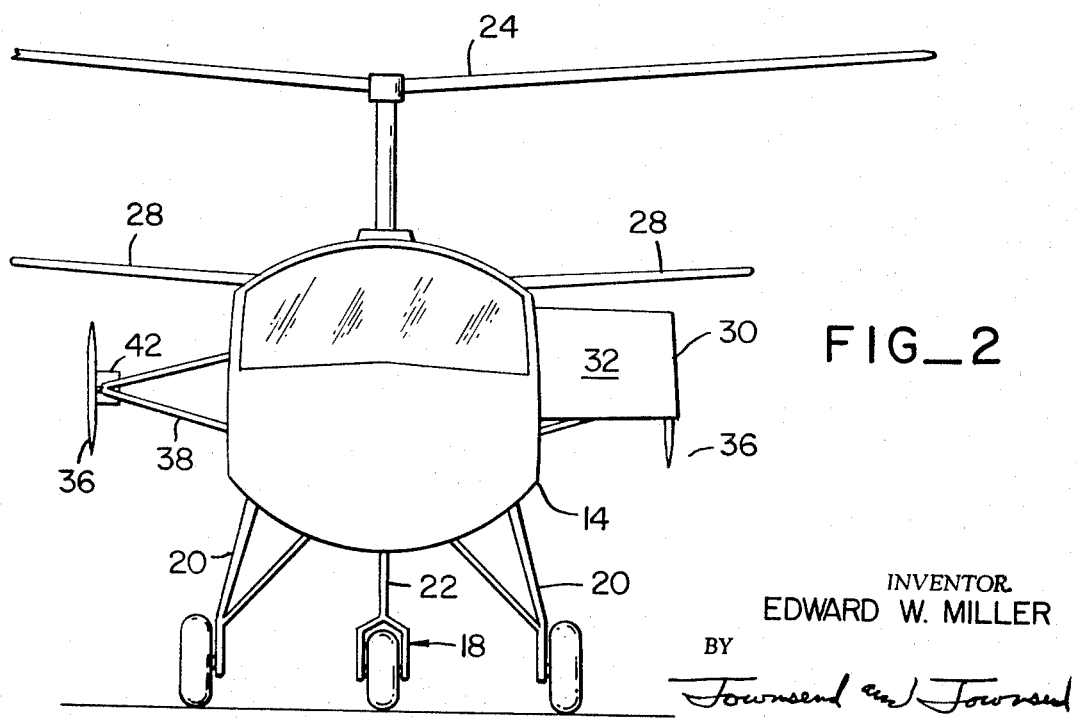
FIG_2
INVENTOR.
EDWARD W. MILLER
BY
Townsend and Townsend
ATTORNEYS

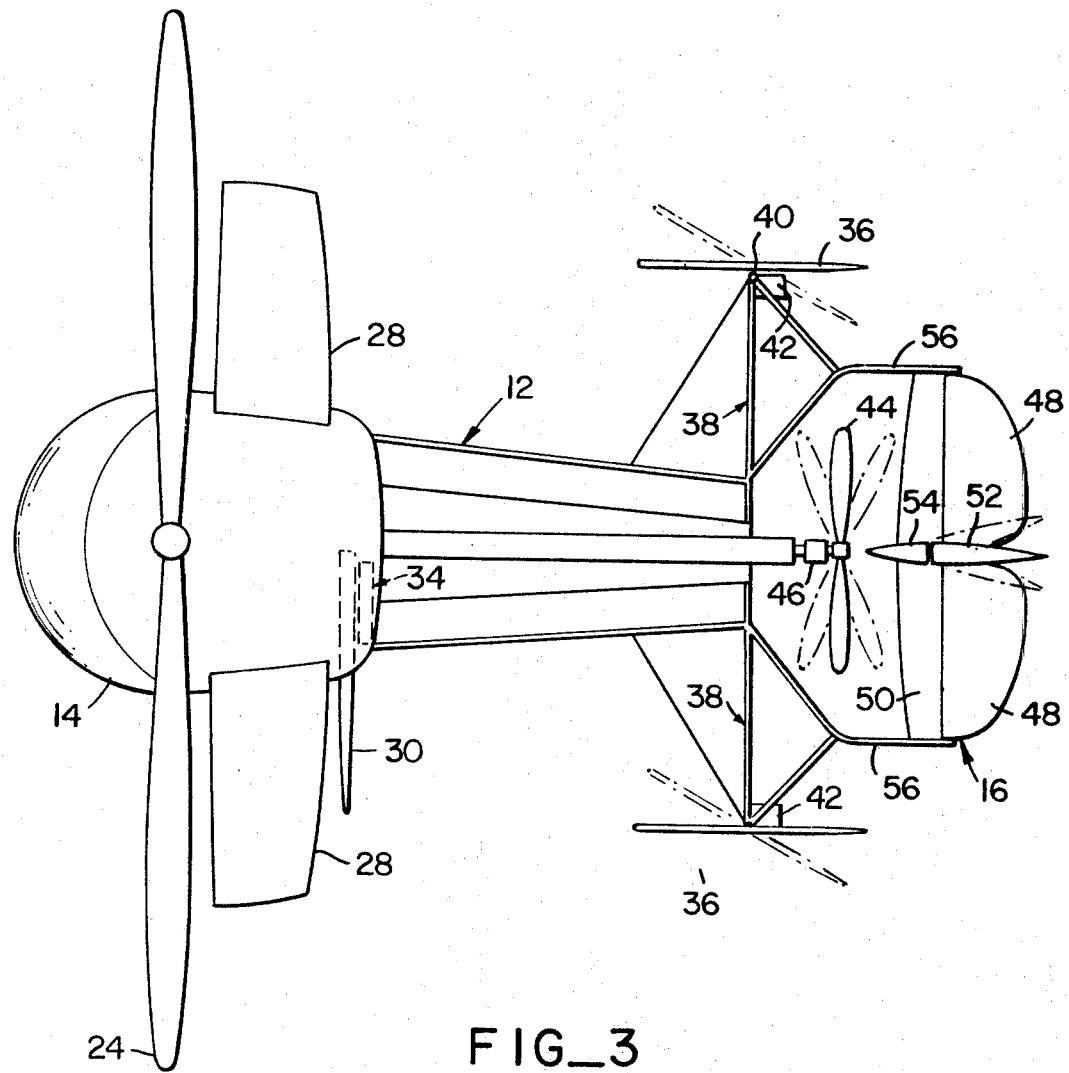
FIG_3
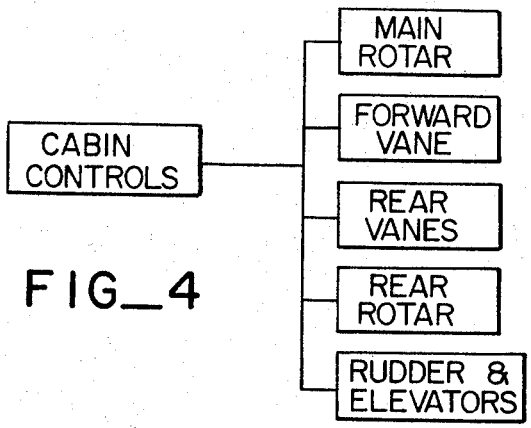
FIG_4
INVENTOR.
EDWARD W. MILLER
BY
Townsend & Townsend
ATTORNEYS

United States Patent Office 3,432,119
Patented Mar. 11, 1969

3,432,119
HELICOPTER
Edward W. Miller, 128 W. 25th Ave.,
San Mateo, Calif. 94403
Filed Oct. 24, 1966, Ser. No. 589,086
U.S. Cl. 244—6                                         12 Claims
Int. Cl. B64c 27/26, 27/06

ABSTRACT OF THE DISCLOSURE

A helicopter having a body provided with a main rotor adjacent to the forward end thereof and a second rotor adjacent to the rear end thereof. The second rotor is swivelly mounted on the body for movement into any one of a number of operative locations angularly disposed relative to the fore and aft axis of the body to provide directional stability therefor. Means is provided to counteract the torque on the body caused by the main rotor. A pair of wings is mounted on the body to provide lift therefor. A tail assembly provides pitch and yaw control of the body.

---

This invention relates to improvements in helicopters, and, more particularly, to a helicopter having improved safety and steering features.

The present invention resides in a helicopter having structural features which increase its airborne safety margins beyond those of helicopters of conventional construction. The helicopter has vane means for more effectively counteracting the torque of the main rotor than is capable with the tail spinner of conventional helicopters. Also, the helicopter has directional control devices including a swivelly mounted rear rotor and a complete tail assembly to supplement or take over the directional control functions of the main rotor. Finally, the helicopter is provided with wings to supplement the lift capabilities of the main rotor. The combination of all of these components provides safety margins for the helicopter which are not available with the equipment now employed on conventional helicopters. Also, taken singly, the components provide added safety for the helicopter to allow the helicopter operator to more effectively meet emergencies which may occur while the helicopter is airborne.

The above mentioned vane means and tail can be used to stabilize and trim the helicopter during flight. This feature gives added control of the helicopter and thereby increased directional stability as well as providing a safety factor. For instance, the vane means can be shifted by small increments so as to change only slightly the torque generated thereby. A small increase in the torque will change the direction of travel of the helicopter resulting in a trim therefor. The rudder and elevators of the tail are capable of being shifted for trimming purposes as is well known in airplane design.

To counteract the torque of the main rotor, the helicopter has shiftable forward and rear vanes disposed to be placed transversely to the forward path of travel of the helicopter. The adjustment of the positions of these vanes is remotely controlled from the cabin of the helicopter and accuracy in positioning of the vanes can be attained as so to compensate for the torque of the rotor even for small changes in the speed of rotation of the rotor.

The shiftable rear vanes are not only responsive to forward movement of the helicopter but are affected by the down draft of the main rotor. The down draft provides air forces on these vanes to deflect the helicopter body in a certain direction depending upon the vane positions relative to the down draft path. Here again some changes in the vane positions will result in a trimming action of the helicopter so that directional control is also obtainable in this manner.

The swivelly mounted rear rotor is normally positioned for rotation about a fore and aft axis. Thus, for straight and level flight, this rotor provides forward thrust for the helicopter. It can be swivelled into any one of a number of operating positions so that it can not only provide yaw control but pitch control as well. The complete tail assembly includes a rudder and elevators and these components, along with the rear rotor, are controlled remotely from the cabin.

The rear rotor is positioned forwardly of the tail so that the propwash from this rotor provides air forces on the rudder and the elevators of the tail. The vertical tail portion is substantially equal in height to the diameter of the rotor and the horizontal tail portion is axially aligned therewith. In this way, the tail is in the optimum position to utilize the propwash of the rear rotor for directional stability purposes.

The primary object of this invention is to provide a helicopter having structural features which increase its airborne safety margins over those of conventional helicopters so that the helicopter pilot may more effectively meet emergencies during airborne operations.

It is an important object of the present invention to provide structural features for a helicopter which enhance its directional control capabilities so that the helicopter will be extremely stable in flight and can be readily trimmed to compensate for unexpected changes in flight conditions.

Another object of the invention is to provide a helicopter of the type described whose structural features permit it to have a relatively clean aerodynamic design so that the helicopter will be economical to operate in addition to having the increased safety margins of the aforesaid character.

A further object of the present invention is to provide a helicopter having a swivelly mounted rear rotor thereon so that this rotor may supplement the forward thrust capabilities of the main rotor as well as to provide directional stability and control for the helicopter itself.

Another object of the invention is to provide a helicopter having control vanes positioned within the normal path of the down draft of the main rotor so that the control vanes can be utilized to counteract the torque of the main rotor as well as for trimming the same to provide the requisite directional stability for safe and comfortable flight conditions.

Other objects of this invention will become apparent as the specification progresses, reference being had to the accompanying drawing wherein:

FIG. 1 is a side elevational view of the helicopter;
FIG. 2 is a front elevational view of the helicopter;
FIG. 3 is a top plan view of the helicopter; and
FIG. 4 is a block diagram of the shiftable control structures of the helicopter and the means for remotely controlling these structures.

Helicopter 10 includes a body 12 having a front end and a rear end and provided with a pilot's compartment or cabin 14 at the front end. Rearwardly of cabin 14, body 12 has an open framework construction and a complete tail assembly 16 is secured to the rear end of the body. Landing gear means 18 is provided for body 12 and, for purposes of illustration, includes a front gear 20 and a rear gear 22.

A main rotor 24 is rotatably mounted on body 12 above cabin 14 and is operably coupled to power means 26 carried in any suitable position on the body. Rotor 24 provides lift and forward thrust for the helicopter and it is of conventional construction, capable of being controlled by a pilot in cabin 14.

A pair of vanes 28 are secured to body 12 and extend laterally from the sides thereof. Vanes 28 are secured in any suitable manner to the body and, for purposes of illustration, they are positioned adjacent to the upper end of the cabin and rearwardly of the vertical axis of rotor 24. Vanes 28 provide lift for the body and thereby augment the lifting capabilities of rotor 24 when the helicopter is moving through the air.

A forward vane 30 is shiftably carried on one side of body 12 and is movable into and out of any one of a number of operative positions disposed transversely to the forward path of travel of the helicopter. Vane 30 has a generally flat forwardmost face 32 against which the force of the air is exerted to provide a torque on body 12 tending to rotate it in a counterclockwise sense when viewing FIG. 3. The purpose of vanes 30 is to counteract the torque on body 12 caused by the rotation of rotor 24. Thus, with vane 30 on the lefthand side of the body rotor 24 will rotate in a clockwise sense when viewing FIG. 3.

Structure 34 carried by body 12 is coupled with vane 30 for reciprocating the latter. Structure 34 is remotely controlled by the pilot in cabin 14.

A pair of rear vanes 36 are provided for the same purpose as vane 30, i.e., to counteract the torque caused by rotor 24. Vanes 36 are pivotally mounted to braces 38 by universal joints 40, such as ball and socket joints. This type of mounting allows vanes 36 to pivot about a horizontal axis and a vertical axis or a combination of both. By pivoting about a vertical axis the vanes are moved into positions disposed transversely of the forward path of travel of the helicopter. Thus, the vanes are in position to be subjected to air forces resulting from the forward movement of the helicopter. These air forces result in a torque being applied to body 12 in a manner such as to overcome the torque of main rotor 24.

By pivoting vanes 36 about horizontal axes, the vanes are subjected to the down draft of the main rotor 24 in a manner to apply a torque to body 12 which counteracts the torque of rotor 24.

The positioning of vanes 36 allows the helicopter to be trimmed in flight to give stability for all flight conditions. A change in these conditions can be compensated by changing the operative positions of vanes 36. Similarly, vane 30 can be used for trimming purposes and can be shifted by a small amount to change the trimming action thereof in the event that flight conditions change.

In FIG. 3, the dash lines represent particular operative positions of vanes 36. Structure 42 is provided for each vane respectively to pivot the latter about the respective pin 40. Structures 42 are remotely controlled from cabin 14. These structures may comprise electrically actuated servomechanisms.

When vanes 36 are parallel to the forward path of the helicopter, they have little or no effect on the body. However, if these vanes are pivoted so that they assume positions transverse to this forward path of travel, they are subjected to air forces which have components tending to rotate helicopter 10 in a counterclockwise sense when viewing FIG. 3. Thus, for clockwise rotation of rotor 24 (when viewing FIG. 3) the forces exerted on vanes 36 provide a countertorque to overcome the torque on the body due to the rotation of rotor 24.

A rear rotor 44 is swively mounted on the rear end of body 12 by a universal joint 46. The purpose of rotor 44 is to normally provide forward thrust for the helicopter and to give directional control thereto when the rotor is shifted by changing the operative position of universal joint 46. Normally, the axis of rotation of rotor 44 is fore and aft but the rotor can be shifted into any one of a number of operative positions, such as the two dash line positions of FIG. 3 wherein the rotor rotates about an axis angularly disposed to the fore and aft axis. In this way, changes in the direction of travel of the helicopter can be made. Moreover, changes in the yaw direction as well as the pitch direction can be made because of the construction of the universal joint.

Rotor 44 may be coupled to power means 26 or any other suitable power source carried on body 12. The rotor as well as the position of the universal joint is controlled from cabin 14.

As shown in FIG. 1, the circular path of travel of rotor 44 extends above and below the transverse height at the rear end of body 12. A major portion of body 12 is of open framework construction so that the air may pass toward and through rotor 44 during forward movement of the helicopter. This feature permits rotor 44 to be more sensitive in providing forward thrust to the body and in providing directional control therefor.

Rotor 44 is disposed forwardly of tail 16 and the latter includes horizontal components as well as vertical components. A pair of shiftable elevators 48 are coupled to a horizontal tail 50 while a shiftable rudder 52 is coupled to a vertical tail 54. Tail 16 is coupled by braces 56 to body 12 and elevators 48 and rudders 52 are controlled by the pilot in cabin 14.

The vertical portion of tail 16 extends downwardly from the horizontal portion to a location corresponding to at least the lower extremity of the plane of rotation of rotor 44. The reason for this is that the propwash of rotor 44 will be used to the maximum extent for stability and control purposes. The horizontal portion of the tail is substantially aligned with the fore and aft axis of the rear rotor for this same reason. The shiftable components of tail 16 can be utilized as is well known to provide a trim for the helicopter while the latter is in flight.

FIG. 4 illustrates that the various operative components of helicopter 10 are controlled from cabin 14. The blocks in the diagram of FIG. 4 represent the entire actuatable structure of the components specified therein.

In operation, a pilot within the cabin 14 will be able to control all of the actuatable components of the helicopter. To cause the helicopter to be air-borne, the pilot will actuate main rotor 24 so that the helicopter will be lifted off the ground and advanced in the forward direction. Rotor 44 will add to the forward thrust of rotor 24 so that a more efficient system is provided for moving the helicopter forwardly.

The pilot will position vanes 30 and 36 to compensate for the speed of rotation of rotor 24. Thus, any tendency for body 12 to rotate in the direction of rotor 24 will be overcome. To this end, vane 30 may operate alone or in combination with vanes 36 or vice versa. Also, vanes 36 may operate independently of each other so that only one of vanes 36 is in operation while the other vane is in a standby condition.

To change the direction of travel of the helicopter, the pilot may actuate universal joint 46 to swing rotor 44 to the proper attitude. This will cause a force to be applied to the rear end of body 12 along a line angularly disposed relative to the fore and aft axis of the body. The helicopter will then move accordingly so as to change its direction. The helicopter may be made to yaw or pitch or yaw and pitch as desired.

Elevators 48 and rudders 52 also may be shifted to permit pitching and yawing. Thus, tail 16 provides directional stability along with that imparted by rotor 44.

The various components of helicopter 10 increase its safety margin because if one set of components fails, another set may still operate to allow the pilot to continue air-borne or to land as is necessary to meet the emergency. For instance, if vane 30 fails, vanes 36 will continue to operate and counteract the torque caused by rotor 24.

If rotor 44 fails to give directional stability, tail 16 will provide this function. Also, wings 28 will provide lift to sustain in an emergency if the lifting capabilities of rotor 24 decrease.

The components providing the safety margin for helicopter 10 render the latter aerodynamically clean so that economical operation is assured. In all cases where braces are used, such as for connecting rear vanes 36 and tail 16 to body 12, the braces are small in dimension and rugged in construction to withstand air loads without creating undesirable turbulence around the helicopter.

Wings 28 provide sufficient lift for the helicopter to permit main rotor 24 to be free wheeling while the helicopter is in flight. Under these conditions, rear rotor 44 will provide the necessary forward thrust although some lift will be provided by the free wheeling rotor 24. Thus, if a power failure to the main rotor occurs, the helicopter can continue on in flight or will remain air-borne at least until a suitable landing can be made.

Helicopter 10 has structural features which increase its safety margins over that of conventional helicopters and these same features provide increased steering capabilities for the helicopter by virtue of being located to be subjected to the air forces resulting from the forward movement and from the down draft of the main rotor. Thus, not only is helicopter 10 safer than conventional helicopters but also its operation is more efficient because of its increased stability. The helicopter can, therefore, be operated in an economical manner without sacrificing the advantages inherent in an aircraft of this type.

What is claimed is:

1. A helicopter comprising: a body having a front end and a rear end and a cabin at the front end; a first rotor mounted on said body adjacent to and above said front end thereof for rotation about a vertical axis to provide lift and forward thrust for the body; means coupled with said first rotor and controlled from said cabin for rotating the same; a vertical tail and rudder assembly secured to said body adjacent to said rear end thereof to provide yaw control for the body; a horizontal tail and elevator assembly secured to said body adjacent to said vertical tail and rudder assembly to provide pitch control for the body; means coupled with said assemblies and controlled from said cabin for actuating the shiftable parts thereof; a pair of wings extending laterally from said body adjacent to said front end and disposed to provide lift therefor; a forward vane; means mounting said forward vane on one side of the body adjacent to the front end thereof for movement into and out of the body with the vane being movable into any one of a number of operative positions disposed transversely to the forward path of travel of the body to counteract the rotating effect on the body due to the rotation of said first rotor; means coupled with said forward vane and controlled from said cabin for selectively shifting said forward vane; a rear vane; means pivotally mounting the rear vane on the body adjacent to said rear end thereof for movement about a generally vertical axis, said rear vane being movable from a location extending substantially parallel to said forward path of travel to any of a number of operative locations extending transversely to said path; means coupled with said rear vane and controlled from said cabin for pivoting the same relative to the body from said cabin; a second rotor; means swivelly mounting the second rotor on the body adjacent to the rear end thereof, said rotor normally being rotatable about an axis extending fore-and-aft of the body to provide forward thrust therefor, said rotor being movable into any of a number of operative locations under the influence of the swiveling action of said mounting means thereof for rotation about axes angularly disposed relative to said fore-and-aft axis to provide directional control for the body when the same is airborne; and means coupled with the mounting means of said second rotor and controlled from said cabin for actuating the swiveling action thereof.

2. A helicopter as set forth in claim 1, wherein said second rotor is disposed forwardly of said assemblies.

3. A helicopter as set forth in claim 1, wherein is provided a second rear vane, the rear vanes being disposed on opposed sides of said body.

4. In a helicopter: a body having a front end and a rear end and provided with a cabin at the front end; a first rotor mounted on said body adjacent to said front end for rotation about a generally vertical axis to provide lift and forward thrust for the body when the first rotor is rotated; power means coupled with said first rotor for rotating the same; a second rotor; means swivelly mounting the second rotor on the body adjacent to the rear end thereof, said second rotor normally being disposed for rotation about a fore-and-aft axis and being operable to provide a forward thrust for the body which augments the forward thrust provided by said first rotor, said second rotor being movable under the influence of the swiveling action of said mounting means into any one of a number of operative locations with its axis angularly disposed with respect to said fore-and-aft axis to provide directional control for the body as said first rotor provides lift and forward thrust therefor; and means coupled with the mounting means of said second rotor for controlling the swiveling action thereof from said cabin.

5. A helicopter as set forth in claim 4, wherein said mounting means for said second rotor comprises a universal joint.

6. In a helicopter as set forth in claim 4, wherein the rear portion of said body comprises an open framework, said second rotor having a blade diameter greater than the transverse dimension of the rear portion of the body adjacent to said rear end thereof.

7. In a helicopter: a body having a front end and a rear end and a cabin at the front end; rotor means on said body to provide lift and forward thrust for said body; a forward vane; means mounting the forward vane on one side of said body adjacent to said front end thereof for movement into and out of the body laterally of the forward direction of travel of the body; means coupled with the forward vane and controlled from said cabin for selectively shifting said forward vane into any one of a number of operative positions whereby the forward vane may adjustably counteract the torque of said rotor means; a rear vane; means pivotally mounting said rear vane on said body adjacent to the rear end thereof; and means coupled with said rear vane and controlled from said cabin for pivoting the rear vane, said rear vane being movable into any one of a number of operative locations disposed to counteract the torque of said rotor means.

8. In a helicopter as set forth in claim 7, wherein is included a second rear vane, said rear vanes being disposed on opposed sides of said body.

9. In a helicopter as set forth in claim 7, wherein is included a rear rotor pivotally mounted on the body adjacent to the rear end thereof for movement into any one of a number of operative locations with the axis of rotation angularly disposed relative to said forward direction of travel.

10. In a helicopter as set forth in claim 7, wherein is provided a pair of wings secured to opposite sides of said body adjacent to said front end thereof, said wings being above and forwardly of said forward vane.

11. In a helicopter: a body having a front end and a rear end and a cabin in the front end; rotor means on said body to provide lift and forward thrust for said body; a forward vane; means mounting thte forward vane on one side of said body adjacent to said front end thereof for reciprocation into and out of the body; means coupled with the forward vane and controlled from said cabin for selectively shifting the said forward vane, the forward vane being movable into any one of a number of operative positions disposed transversely of the forward path of travel of the body whereby the forward vane may counteract the torque of said rotor means; a rear vane spaced laterally from said body; means including a pivot joint for pivotally mounting said rear vane on said body adjacent to the rear end thereof; and means coupled with said rear vane and controlled from said cabin for pivoting said rear vane, the rear vane being movable into any one of a number of operative locations disposed to counteract the torque of said rotor means.

12. In a helicopter: a body having a front end and a rear end and provided with a cabin at the front end; a first rotor mounted on said body adjacent to said front end for rotation about a generally vertical axis to provide lift and forward thrust for the body when the first rotor is rotated; means coupled with said first rotor for rotating the same; a second rotor; means swivelly mounting the second rotor on the body adjacent to the rear end thereof, said second rotor normally being disposed for rotation about a fore-and-aft axis to provide forward thrust for the body and being movable under the influence of the swiveling action of said mounting means into any one of a number of operative locations with its axis angularly disposed with respect to said fore-and-aft axis to provide directional control for the body; means coupled with the mounting means of said second rotor for controlling the swiveling action thereof from said cabin; and a tail assembly secured to the rear end of the body, said second rotor being disposed adjacent to and forwardly of said tail assembly, said tail assembly including a vertical portion and a horizontal portion, the vertical portion having at least the same height as the normal plane of rotation of said second rotor, the horizontal portion being substantially aligned with said fore-and-aft axis.

References Cited

UNITED STATES PATENTS

| | | | |
|---|---|---|---|
| 1,568,765 | 1/1926 | Ortego | 244—17.19 |
| 2,405,244 | 8/1946 | Stanley | 244—17.21 |
| 2,581,396 | 1/1952 | Erickson | 244—17.19 |
| 2,653,778 | 9/1953 | Bennett et al. | 244—6 |
| 2,723,091 | 11/1955 | Davies et al. | 244—113 |
| 3,281,096 | 10/1966 | Konecheck | 244—51 |

FOREIGN PATENTS 1,227,192  2/1960  France.

MILTON BUCHLER, *Primary Examiner.*

THOMAS W. BUCKMAN, *Assistant Examiner.*

U.S. Cl. X.R.

244—17.19, 54